United States Patent
Kurosaki et al.

(10) Patent No.: US 8,172,396 B2
(45) Date of Patent: May 8, 2012

(54) BIFOCAL LENS AND BIFOCAL EYEGLASSES

(75) Inventors: Hisayoshi Kurosaki, Hyogo (JP); Takashi Tsutsumi, Osaka (JP)

(73) Assignee: Hisayoshi Kurosaki, Akashi-Shi (JP)

( * ) Notice: Subject to any disclaimer, the term of this patent is extended or adjusted under 35 U.S.C. 154(b) by 235 days.

(21) Appl. No.: 12/671,800

(22) PCT Filed: Oct. 21, 2008

(86) PCT No.: PCT/JP2008/069026
§ 371 (c)(1), (2), (4) Date: Feb. 2, 2010

(87) PCT Pub. No.: WO2009/075140
PCT Pub. Date: Jun. 18, 2009

(65) Prior Publication Data
US 2011/0228216 A1    Sep. 22, 2011

(30) Foreign Application Priority Data
Dec. 10, 2007   (JP) .................. 2007-318281

(51) Int. Cl.
*G02C 7/06* (2006.01)
(52) U.S. Cl. ....................................... 351/168
(58) Field of Classification Search ........... 351/168–172
See application file for complete search history.

(56) References Cited

U.S. PATENT DOCUMENTS
4,869,588 A * 9/1989 Frieder et al. ............ 351/168

FOREIGN PATENT DOCUMENTS
| JP | 6-84428 U | 12/1994 |
| JP | 10-186290 A | 7/1998 |
| JP | 2004-118173 A | 4/2004 |

* cited by examiner

*Primary Examiner* — Darryl J Collins
(74) *Attorney, Agent, or Firm* — Birch, Stewart, Kolasch & Birch, LLP

(57) ABSTRACT

A bifocal lens and bifocal eyeglasses by which strangeness felt during using a near-vision portion is removed, a place according to the purpose of use can clearly be selected, and costs are reduced. The bifocal lens for eyeglasses is constituted of a single material with a uniform refractive index and is provided with a lens for presbyopia (1B) used for looking at something near at a portion of a body lens part (1A) used for looking at something in the distance. The lens for presbyopia (1B) is formed of an upper side which is generally horizontal when used, a lateral side on the ear side which continues to the upper side and expands toward the ear, and a lower side parallel to the peripheral shape of the lower side of an eyeglass frame to be generally circular-arc or generally rectangular as a whole. The upper side and the lateral side form a generally straight boundary line which can be recognized by a user.

16 Claims, 7 Drawing Sheets

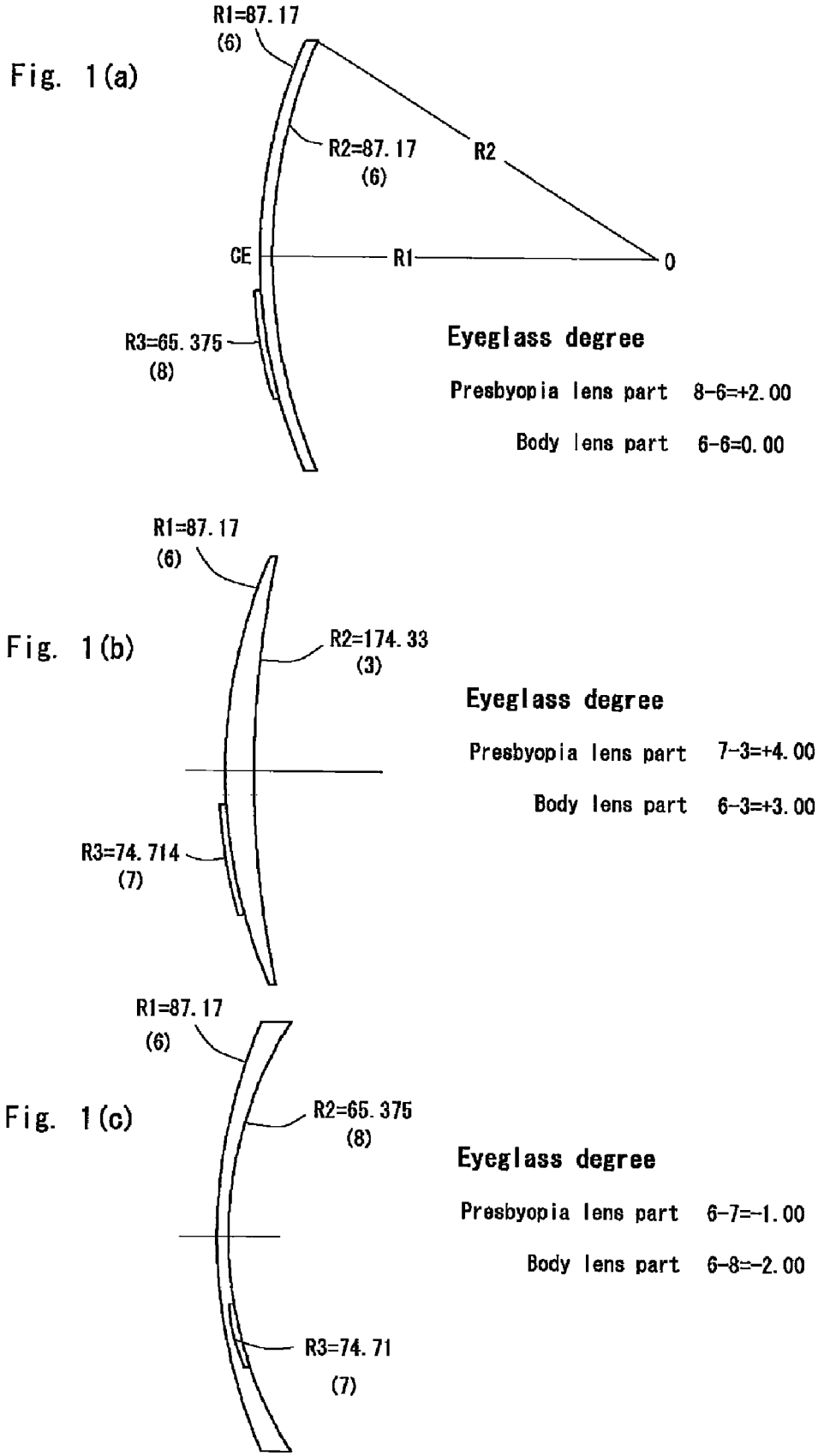

Coordinates of point A $(X1, Y1, \sqrt{R1^2-X1^2-Y1^2})$

Center of curvature (point P)
of radius of curvature R3

Coordinates of point P
$Z1 = \sqrt{R1^2-X1^2-Y1^2} - \sqrt{R3^2-X1^2-Y1^2}$

BIFOCAL LENS AND BIFOCAL EYEGLASSES

TECHNICAL FIELD

The present invention relates to a bifocal lens in which a user can definitely recognize which one of the bifocal lens the user is currently using, and the field of view for near vision in the right-and-left direction is wide, as well as to bifocal eyeglasses using the same.

BACKGROUND ART

As a lens for current bifocal eyeglasses, a progressive lens is widely known. The progressive lens is also referred to as "no-line bifocal lens", where a far-vision region for looking at something in the distance, a near-vision region for looking at something near (presbyopia part), and an intermediate region are disposed in one lens.

The intermediate region is a region in which, from diopter power (hereafter referred to as eyeglass degree) of the far-vision region to the eyeglass degree of the near-vision region, the eyeglass degree is progressively changed. For example, refractive power is changed by a method disclosed in Patent Document 1.
Patent Document 1: JP-A-09-159976

In these progressive lenses, the eyeglass degree changes in a non-step manner from the far to the near, thereby providing an advantage in that any distance can be focussed with one lens. Also, since there is no boundary in the outer appearance, a so-called sense of agedness is absent, so that it is excellent in fashion property.

DISCLOSURE OF THE INVENTION

Problems to be Solved by the Invention

However, regarding the progressive lens, the production costs thereof are high, and also not a little disadvantage may occur at the time of use.

First, in the progressive lens, when the user looks through the intermediate region in which the eyeglass degree changes progressively, an object may be seen as being distorted, or a vibration may be felt when the face is swung in the right-and-left direction. In particular, since the user cannot recognize the boundary line of the near-vision region and the intermediate region, the aforementioned disadvantage is inevitable until the user becomes fully accustomed to the use of the progressive lens, whereby even an accident of falling down may occur. This disadvantage is conspicuous at the time of work when the user must repeatedly look at the far area and the near area. For example, this disadvantage will be a problem not only at the time of highly dangerous mechanical operation that is executed at the construction site or production site but also at the time of driving a general automobile or at the time of fishing involving attachment and removal of a bait.

Also, there is an astigmatism region to the right and the left of the near-vision region of the progressive lens (see FIG. 10), and an object is seen to be blurred in a double manner when this region is used. Therefore, when the user must carefully read sentences that continue to be long in the lateral direction for a long period of time, or when a monitoring activity must be carried out widely by closely watching down to the details of a large screen in the right-and-left direction, the disadvantage will be conspicuous.

The present invention has been made in view of the above-described circumstances, and an object thereof is to provide a bifocal lens and bifocal eyeglasses by which strangeness felt during using a near-vision region is removed, a place according to the purpose of use can clearly be selected, and costs are reduced.

Means for Solving the Problems

To achieve the above object, the present invention provides a bifocal lens for eyeglasses constituted of a single material with a uniform refractive index and provided with a presbyopia lens part used for looking at something near at a portion of a body lens part used for looking at something in the distance, wherein the presbyopia lens part is formed of an upper side which is generally horizontal when used, a lateral side on the ear side which continues to the upper side and expands toward the ear, and a lower side parallel to the peripheral shape of the lower side of an eyeglass so as to have a generally circular-arc shape or a generally rectangular shape as a whole, and the upper side and the lateral side form a generally straight boundary line which can be recognized by a user.

The bifocal lens of the present invention is mounted onto eyeglasses in the state of use. Further, in eyeglasses in which an eyeglass frame is present, the peripheral shape constituting the lower side accords to the peripheral shape of an eyeglass frame.

Here, the bifocal lens of the present invention is not limited to the case in which this is singly mounted onto the eyeglass frame. For example, the bifocal lens can be used by constructing the plate thickness of the bifocal lens to be about 1.0 mm and laminating a different lens having a plate thickness of about 1.0 mm thereon. The different lens is not limited to a simple transparent lens, but may be a UV-cut lens having an ultraviolet ray cutting function, a photochromatic lens whose color darkens by reacting with ultraviolet rays, or a colored lens containing neodymium or the like. In such a case, it is suitable to dispose a polarizing film between the bifocal lens and the different lens.

The bifocal lens of the present invention is constituted of a single material having a uniform refractive index, so that a joining part, a bonding part, a denatured part of the material, and the like are absent. Therefore, there is no need to perform an operation such as providing a recess in a portion of the body lens portion and mounting a presbyopia part onto this, so that the production costs can be greatly reduced, and the precision of the finished product can be improved.

The present invention is suitably realized as an integrally molded product made of glass or plastics. However, in order to let the bifocal lens of the present invention be made of glass, a fine pressing method is preferably used.

In the fine pressing method, an intermediate lens body (pre-form) made of glass is produced which is molded to have a shape close to the final shape of the bifocal lens. Then, after the intermediate lens body is finished to be fine by a surface treatment such as a polishing process, this is heated to be softened, and a male mold and a female mold are pressed to finish this into a bifocal lens having a final shape.

Specific production methods can be classified into the simultaneous heating method and the separate heating method, and either of these may be adopted. For example, in the case of adopting the simultaneous heating method, the intermediate lens body is mounted on a polished mold, whereafter the mold and the intermediate lens body are heated simultaneously. Then, when the intermediate lens body is suitably softened, press-molding is carried out. After the temperature is lowered to a temperature lower than or equal to the transition point at which the glass will not be deformed in a state of being pressed with the mold, the bifocal lens having a final shape is taken out. This simultaneous heating method is particularly suitable for the production of a small lens, and a low-melting-point glass (low-melting glass) having a glass transition temperature of 600° C. or lower is suitably used.

On the other hand, in the separate heating method, while a mold is heated to have a predetermined temperature, an intermediate lens body is separately heated. Then, in a state in which the intermediate lens body is suitably softened, the intermediate lens body is sent into the mold in the heated state so as to be press-molded. Here, since the temperature of the mold is set to be lower than the softening temperature of the intermediate lens body, the temperature of the intermediate lens body lowers before the intermediate lens body and the mold are fused, whereby the press-molding is enabled. By this separate heating method, a large-scale lens can be produced, and also glass having an ordinary melting point can be used besides the low-melting-point glass. Here, the pressing mold is not limited to the above-described mold, so that carbon or ceramics can be used.

Typically, for the bifocal lenses of the present invention, a pair of substrate lenses molded approximately in a disk shape and constructed to be symmetric relative to the right-and-left direction are used by being cut out to accord to the pupil position of the user and the shape of the eyeglass frame.

Also, in the present invention, a presbyopia lens part used for looking at something near is provided in a portion of a body lens part used for looking at something in the distance, and a boundary line recognizable by a user is formed. For this reason, the user can always clearly recognize which of the body lens part and the presbyopia lens part the user is currently using. This boundary line may be formed on the outer surface facing the field of view, or conversely may be formed on the inner surface close to the pupil.

In any case, since the intermediate region is absent in the present invention, only one of a far area and a near area can be focussed. However, according to the study or the experiment of the present inventors, a progressive part is not particularly needed. Rather, the present inventors have confirmed that there are many cases in which the advantage of being able to recognize clearly which of the site for the far area and the site for the near area is currently used is high.

The presbyopia lens part of the present invention is formed of an upper side which is generally horizontal when used, a lateral side on the ear side which continues to the upper side and expands toward the ear, and a lower side parallel to the peripheral shape of the lower side of an eyeglass frame so as to have a generally circular-arc shape or a generally rectangular shape as a whole, and the aforesaid upper side and the aforesaid lateral side form a generally straight boundary line that can be recognized by a user.

In the conventional bifocal lens, the presbyopia part is formed to have a circular spot shape. In contrast, in the present invention, the lower side of the presbyopia lens part has a shape parallel to the peripheral shape of the lower side of the eyeglass frame. Therefore, even in a case in which the field of view comes close to the nose side and the user looks at one point in a concentrated manner, the focus will not shifted. Also, with the presbyopia part formed to have a circular spot shape, the head must be swung frequently for reading or the like due to its narrow field of view. In contrast, in the present invention, there is no need to swing the head unnecessarily.

Also, since the presbyopia lens part of the present invention is formed of an upper side which is generally horizontal when used, a lateral side on the ear side which continues to the upper side and expands toward the ear, and a lower side parallel to the peripheral shape of the lower side of an eyeglass frame, and the upper side and the lateral side form a generally straight boundary line that can be recognized by a user, a so-called sense of agedness is absent, so that it is excellent in fashion property.

Here, it is also suitable that the presbyopia lens part of the present invention is disposed to be separated into two sites in the up-and-down direction in a state of use (see FIG. 8). In this case, as shown in FIG. 8, the presbyopia lens part disposed on the upper side is formed of a lower side which is generally horizontal when used, a lateral side which continues to the lower side and goes upwards, and an upper side parallel to the peripheral shape of the upper side of an eyeglass frame so as to have a generally circular-arc shape or a generally rectangular shape as a whole, and the lower side and the lateral side form a generally straight boundary line that can be recognized by the user.

Also, as to the body lens part of the present invention, there are a case of not having a function of correcting the eyesight (eyeglass degree=0), a case of having a function of correcting a far eyesight (eyeglass degree is positive), and a case of having a function of correcting a near eyesight (eyeglass degree is negative). Also, it is suitable to allow the body lens part and/or the presbyopia lens part to have a function of correcting an astigmatic eye.

For example, in the case of providing a presbyopia lens part in a portion of the body lens part having a eyeglass degree≧0, it is suitable that the body lens part is constituted of an outer spherical surface on the field-of-view side formed with a first radius of curvature R1 and an inner spherical surface on the pupil side formed with a second radius of curvature R2 equal to or larger than the first radius of curvature, and that the boundary line is formed on the outer spherical surface.

FIG. 1(a) exemplifies a case in which a presbyopia lens part of an eighth curve (third radius of curvature R3=65.375) is provided in a body lens part constituted of a sixth curve and a sixth curve. As illustrated, the boundary line is formed on the outer spherical surface. The radius of curvature R (R1 to R3) mm of the lens is determined by the refractive index N and the curve number C, where the calculation formula is as follows.

$$R = (N-1)*1000/C$$

For example, assuming that the refractive index is 1.523, the radius of curvature R1=R2 of the sixth curves shown in FIG. 1(a) is (1.523−1)*1000/6=87.17 mm, and the radius of curvature R3 of the eighth curve is (1.523−1)*1000/8=65.375 mm. Since the eyeglass degree is specified by the difference in the curve numbers, the bifocal lens of FIG. 1(a) has a body lens part having an eyeglass degree of 0.00 and a presbyopia lens part having an eyeglass degree of +2.00.

On the other hand, the body lens part shown in FIG. 1(b) is constituted of a sixth curve and a third curve, and has an eyeglass degree of +3.00. When a presbyopia lens part of a seventh curve (third radius of curvature R3=74.714) is provided in this body lens part, an eyeglass degree of +4.00 will be ensured to the near field of view.

In the case of providing a presbyopia lens part in a portion of the body lens part having a eyeglass degree <0, it is suitable that the body lens part is constituted of an outer spherical surface on the field-of-view side formed with a first radius of curvature R1 and an inner spherical surface on the pupil side formed with a second radius of curvature R2 smaller than the first radius of curvature, and that the boundary line is formed on the inner spherical surface.

FIG. 1(c) exemplifies a case in which a presbyopia lens part of a seventh curve (radius of curvature R3=74.71 mm) is provided in a body lens part constituted of a sixth curve (radius of curvature R1=87.17 mm) and an eighth curve (radius of curvature R2=65.375 mm). As illustrated, the boundary line is formed on the inner spherical surface. In the case of the illustrated example, the body lens part has an eyeglass degree of −2.00, and has a function of correcting a near eyesight, whereas the eyeglass degree of the presbyopia lens part is −1.00. By alleviating the near eyesight correcting function, a clear field of view in the near is ensured.

In such a case, no step difference is formed on the outer surface, so that it is easy to stick a polarizing film or the like thereonto. Also, since the outer surface is flat, the boundary line is not noticed by others, so that it is excellent in fashion property. For this reason, in such an invention, the shape of the presbyopia lens part can be freely set, and there is not necessarily a need to adopt the molding method. For example, in the case in which the outer circumference of the presbyopia lens part has a circular arc shape, the presbyopia lens part can be formed by polishing work.

Here, in FIG. 1(c), the presbyopia lens part is constructed to have a concave shape. However, depending on the eyeglass degree, the presbyopia lens part is formed to have a convex shape towards the pupil side.

In the meantime, in any of the above-described inventions, a substrate lens for a left eye and a substrate lens for a right eye must be separately produced. Therefore, in order to solve this problem, the presbyopia part should be formed of an upper side which is generally horizontal when used, a lateral side on the ear side which is perpendicular to the upper side, and a lower side parallel to the peripheral shape of the lower side of an eyeglass frame so as to have a generally circular-arc shape or a generally rectangular shape as a whole, and the upper side and the lateral side should form a generally straight boundary line that can be recognized by a user (see FIG. 9).

In the case of adopting a construction such as in FIG. 9, there will be no need to produce a substrate lens for a left eye and a substrate lens for a right eye separately as in the other inventions. In this case, it is preferable that the distance H between the horizontal line and the upper side at the time of use that passes through the warpage apex of the lens body part coincides with the distance H between the vertical line and the lateral side at the time of use that passes through the warpage apex.

Effects of the Invention

According to the present invention described above, a bifocal lens and bifocal eyeglasses can be realized by which strangeness felt during using a near-vision region is removed, a place according to the purpose of use can clearly be selected, and costs are reduced.

BRIEF DESCRIPTION OF THE DRAWINGS

FIGS. 1(a) to 1(c) are principle view showing the relationship between a radius of curvature and lenses for eyeglasses.

BEST MODES FOR CARRYING OUT THE INVENTION

Figure 2A:
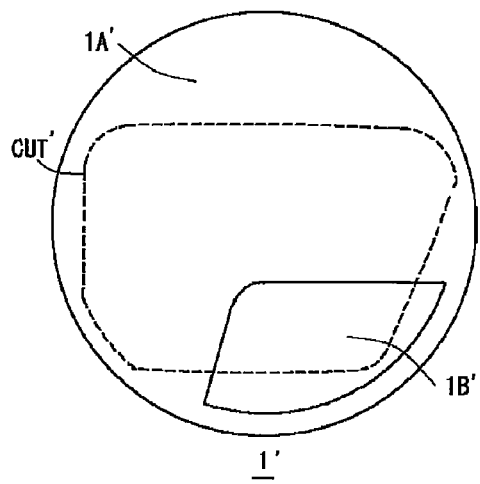
FIGS. 2(a) to 2(d) are plan views for describing a bifocal lens according to an embodiment.
Figure 2B:
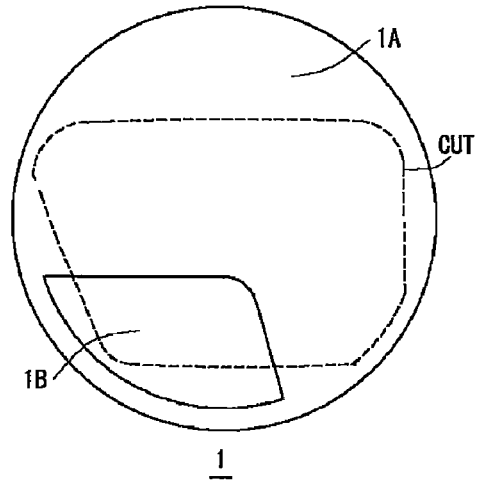

Hereafter, the present invention will be described in detail with reference to the embodiments. FIG. 2(b) is a front view showing a substrate lens 1 for a left eye that has been molded generally in a disk shape. This substrate lens 1 is cut out along a broken line CUT to accord to the pupil position of a user and the shape of an eyeglass frame, and is mounted on the left eye part of the eyeglass frame. Here, FIG. 2(a) shows a substrate lens 1' for a right eye, and is constructed to be symmetric to the substrate lens 1 for the left eye relative to the right-and-left direction.

Figure 2C:
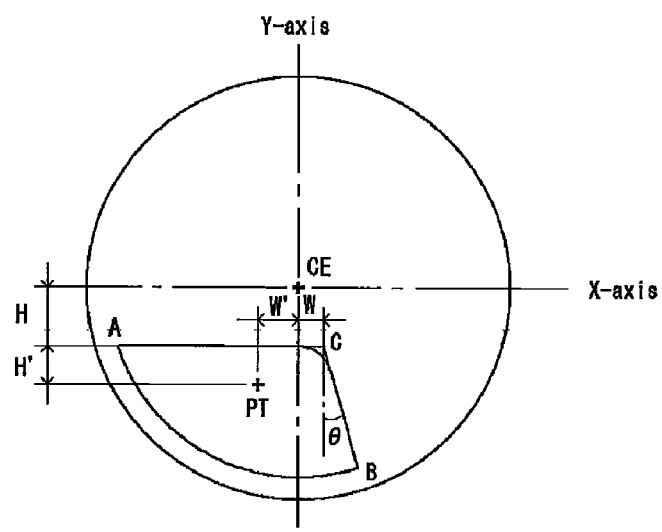
Figure 2D:
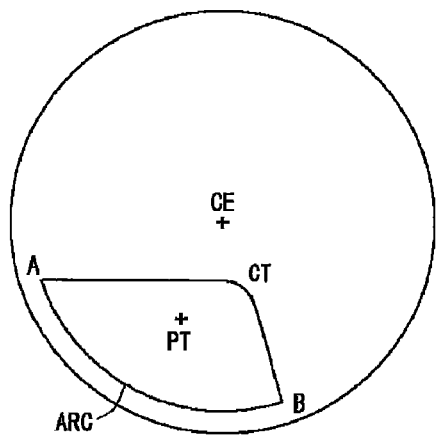

As shown in FIGS. 2(b) to 2(d), the substrate lens 1 for the left eye is constructed in such a manner that a presbyopia lens part 1B is disposed in the lower left portion of a body lens part 1A. The body lens part 1A is a part for looking at something in the distance, and is formed of an outer spherical surface having a first radius of curvature R1 and an inner spherical surface having a second radius of curvature R2 as shown in FIGS. 1(a) to 1(c) described before. Here, the radius of curvature R1 and the radius of curvature R2 satisfy any of the relationships of R1=R2, R1>R2, and R1<R2 according to the eyeglass degree of the user.

In the state of the substrate lens 1, the body lens part 1A has a completely circular shape in a plan view, and the center thereof (warpage apex) CE is an optical center CE (FIG. 2(c)). In other words, the curvature center O of the outer spherical surface is the rear side perpendicular to the document sheet of FIG. 2, and is located at a position spaced apart from the optical center CE by the radius of curvature R1 (see FIG. 1(a)).

The presbyopia lens part 1B is a part that is constituted of an outer spherical surface having a third radius of curvature R3. The curvature of this presbyopia lens part 1B is managed by the position of a management point PT along with the arrangement position and the arrangement posture of the presbyopia lens part 1B. Here, in the embodiment of FIG. 1(a), the first radius of curvature R1=the second radius of curvature R2, and the third radius of curvature R3 is set to satisfy R3<R1=R2.

As shown in FIG. 2(d), the presbyopia lens part 1B in the front view forms a peripheral fringe generally having a fan shape as a whole with a first terminal point A located on the left side for the left eye, a second terminal point B located to the lower right for the left eye, and a central part CT having an arc-shaped outline. Here, for the sake of description, the virtual intersection of the connection line between the first terminal point A and the central part CT and the connection line between the second terminal point B and the central part CT may be referred to as a third terminal point C.

In this embodiment, the connection line between the first terminal point A and the central part CT constitutes an upper side that will be horizontal when used. Also, the connection line between the second terminal point B and the central part CT constitutes a lateral side on the ear side which continues to the upper side and expands toward the ear. The upper side and the lateral side form a straight boundary line that can be recognized by the user.

As illustrated, the first terminal point A and the second terminal point B are connected in a circular arc shape. The first terminal point A and the second terminal point B are arranged to be sufficiently close to each other on the outer circumference of the substrate lens 1 so that the inside of the connection line ARC having a circular arc shape will be cut out (see the broken line CUT). Therefore, when used (cut-out state), a lower side parallel to the peripheral shape of the lower part of the eyeglass frame is formed in the inside of the connection line ARC. Then, when the bifocal lens is used, the upper side, the lateral side, and the lower side are formed to have a generally circular-arc shape or a generally rectangular shape as a whole.

Subsequently, mutual relationship in the front view among the first terminal point A, the second terminal point B, the third terminal point C, the management point PT, and the warpage apex CE will be described.

First, the warpage apex CE is an optical center for looking at something in the distance. Therefore, at the time of cutting out a bifocal lens each from a pair of substrate lenses 1', 1 constructed to be symmetric relative to the right-and-left direction and mounting the bifocal lens onto the eyeglass frame, the spacing distance of the optical centers CE of the body lens parts 1A', 1A of the right and the left is made to coincide approximately to the spacing distance of the right and left pupils of the user. Also, the optical centers CE are arranged at a position close to the center in the plumb-line direction of the eyeglass frame. Here, in the embodiment of FIG. 2, the optical centers CE are arranged a little upwards from the central position of the eyeglass frame.

The third contact point C is positioned to be shifted towards the ear side from the optical center CE of the body lens part 1A. For this reason, the presbyopia lens part 1B is extended to the outside from the right and left pupil positions, and a near field of view can be ensured in the right-and-left direction. However, because of the wide field of view in the near, the field of view in the distance will be narrow. Therefore, in order to ensure the safety at the time of use, the horizontal distance W between the third contact point C and the optical center CE of the body lens part is set to be less than or equal to 18.0 mm.

The second contact point B and the third contact point C form a lateral side having a straight line shape that expands toward the ear by an inclination angle θ. For this reason, the field of view on the outside in the horizontal direction in the glass body part 1A can be ensured, and the field of view in the horizontal direction in the presbyopia lens part 1B can be widely taken. As in the illustrated example, the inclination angle θ of the lateral side is set to be about 14° to 18° for general use; however, the inclination angle θ can be changed within a range of 0° to 45° depending on the purpose of use.

The management point PT is a part that manages the curvature center P of the presbyopia lens part 1B constructed to be a spherical surface having a radius of curvature of R3. The curvature center P is determined in relation to the normal line of the management point PT. The positional relationship between the management point PT and the curvature center P will be described later in detail.

In a plan view, the management point PT is disposed to be shifted towards the inner side (nose side) in the horizontal direction from the optical center CE of the body glass part 1A. This horizontal spacing distance W is determined within a range of 2 to 11 mm depending on the eyeglass degree of the presbyopia lens part 1B. The illustrated example is a case in which the eyeglass degree of the presbyopia lens part 1B is +2.00, and the horizontal spacing distance W is set to be around 6 mm. On the other hand, in the case in which the eyeglass degree is larger than or equal to +3.00, the management point PT is disposed to be further shifted towards the inner side.

Also, in a plan view, the management point PT is disposed to be shifted downwards in the plumb-line direction from the optical center CE of the body glass part 1A. This plumb-line spacing distance H+H' is determined within a range of 8 to 15 mm, and is set to be around 11 mm for general use. In relation to this setting, the plumb-line spacing distance H' between the presbyopia lens part 1B and the optical center CE is determined within a range of 4 to 9 mm, and is set to be around 6 mm for general use.

In the meantime, if the plumb-line spacing distance H between the upper side of the presbyopia lens part 1B and the optical center CE of the body lens part 1A is too small, the field of view at the time of looking at something in the distance will be narrow, thereby giving a stress. On the other hand, if the plumb-line spacing distance H is too large, the field of view at the time of looking at something near will be narrow. Thus, the plumb-line spacing distance H is set to be 4.0 to 7.0 mm, and is set to be around 5.0 mm for general use. Therefore, for the general use, the spacing distances H and H' have almost identical dimensions, and satisfy H'>H.

Subsequently, the curvature center P of the presbyopia lens part 1B constructed to be a spherical surface having a radius of curvature R3 will be described. For determination of the curvature center P, a viewpoint of alleviating the step difference formed on the boundary line will be needed in addition to an optical viewpoint.

<Basic Design>

Figure 3A:
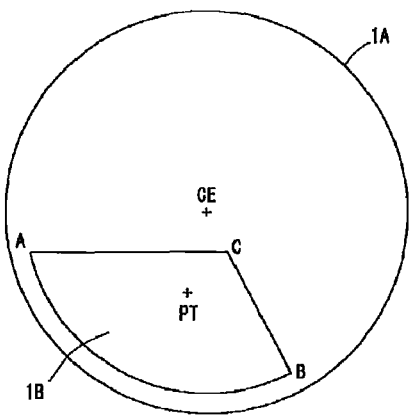
FIGS. 3(a) to 3(d) are views for describing a presbyopia lens part.
Figure 3B:
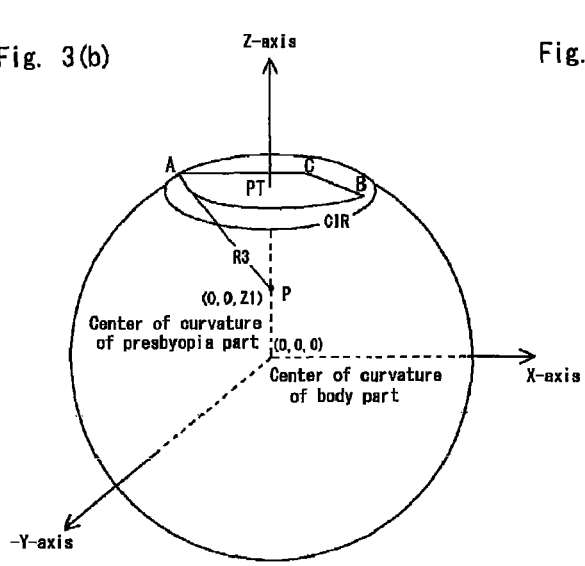

Therefore, first on the basis of FIGS. 3 to 4, a simple designing technique of setting the optical center of the presbyopia lens part 1B to be at the management point PT will be described. Here, in FIGS. 3 to 4, for the sake of description, the radius line connecting the curvature center O of the body lens part 1A and the management point PT is assumed to be the Z-axis (see FIG. 3(b)). Also, as viewed from the Z-axis, the X-axis is set parallel to the connection line (upper side) between the first terminal point A and the third terminal point C, and the Y-axis is set to be perpendicular to this X-axis (see FIG. 3(c)).

In such a coordinate setting, when the coordinate positions on the X-Y coordinates of the first terminal point A, the second terminal point B, and the third terminal point C are specified, the spherical surface of the presbyopia lens part 1B containing all of the terminal points (spherical surface having a radius of curvature R3) can be determined.

In this case, when a condition that "at least any one of the first to third terminal points is in contact with the peripheral fringe (virtual circular outline CIR) of the presbyopia lens part 1B", the spherical surface of the presbyopia lens part 1B can be specified uniquely. Here, since the curvature center P of the presbyopia lens part is located on the Z-axis, the coordinates thereof are assumed to be $(0, 0, Z1)$ (see FIG. 3(d)). In this case, since the management point PT is located on the spherical surface having a radius of curvature R3, the coordinates thereof will be $(0, 0, R3+Z1)$.

Figure 3C:
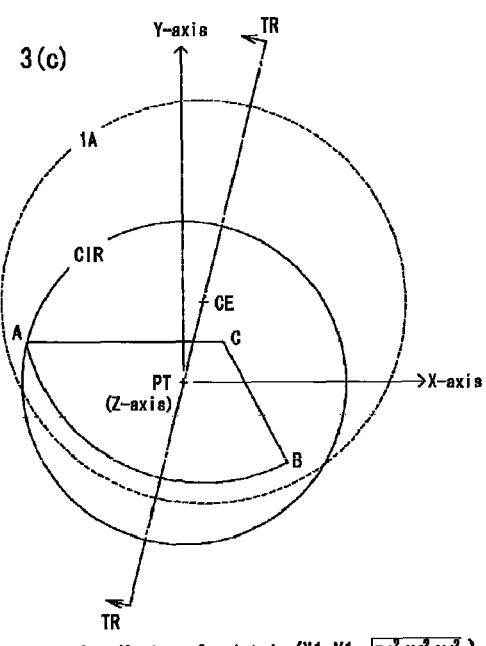

FIG. 3(c) illustrates the virtual outline CIR of the sphere with respect to the presbyopia lens part 1B that has been uniquely specified. In this example, the first terminal point A is in contact with the virtual outline CIR. When the first terminal point A is in contact with the virtual outline CIR, the first terminal point A is positioned on the spherical surface having a radius of curvature R1, so that the coordinates of the first terminal point A will be $(X1, Y1, SQR(R1^2-X1^2-Y1^2))$.

Therefore, by substituting the coordinates of the first terminal point A $(X1, Y1, SQR(R1^2-X1^2-Y1^2))$ into the equation $[x^2+y^2+(z-Z1)^2=R3^2]$ of the sphere having a radius of curvature R3, the value of Z1 can be specified. To sum up, the curvature center of the sphere having a radius of curvature R3 can be specified. Specifically, the following equation will holds: $Z1=SQR(R1^2-X1^2-Y1^2)-SQR(R3^2-X1^2-Y1^2)$.

Figure 3D:
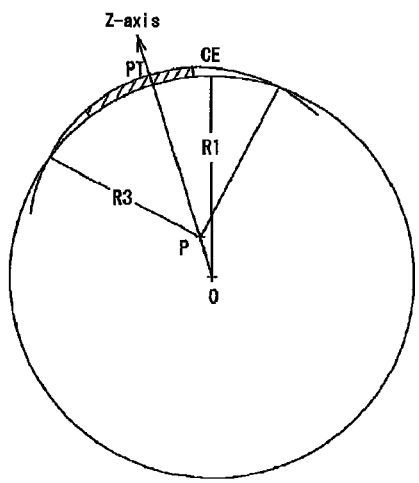

FIG. 3(d) shows a cross-sectional view that has been cut along the TR-TR line of FIG. 3(c), and show the actual presbyopia lens part 1B that is specified by the three terminal points (A, B, C) shown in FIG. 3(a) in hatches. As illustrated, in this state as it is, the step difference of the boundary line may be too large. In such a case, the step difference of the boundary line, for example, is corrected smoothly in a circular arc shape. Alternatively, in a state shown in FIG. 3(d), the curvature center may be moved from (0, 0, Z1) by minute amounts α, β, γ to be changed to (0±γ, 0±β, Z1÷γ).

<Practical Design>

Figure 4A:
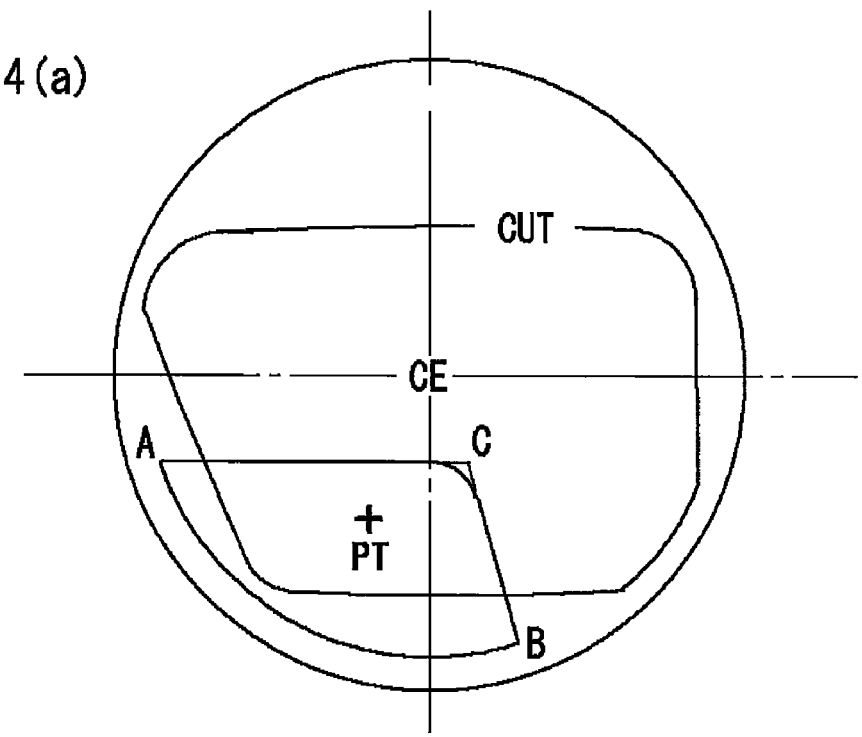
FIGS. 4(a) to 4(b) are views for describing another presbyopia lens part.
Figure 4B:
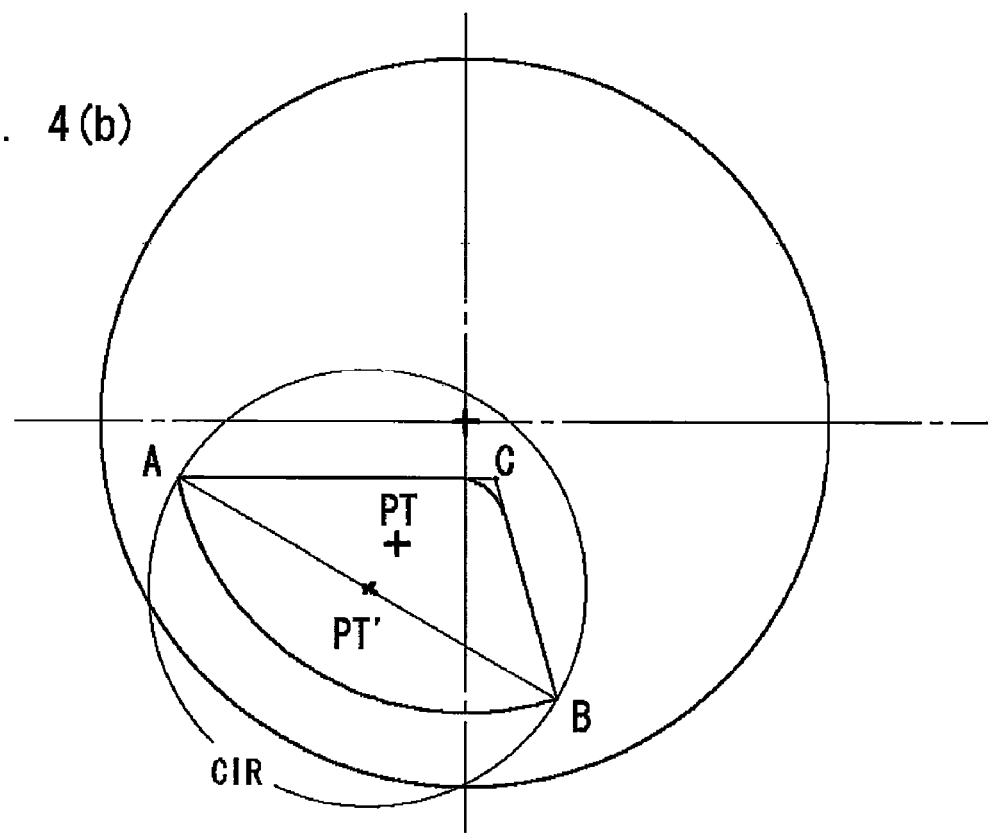
Figure 5:
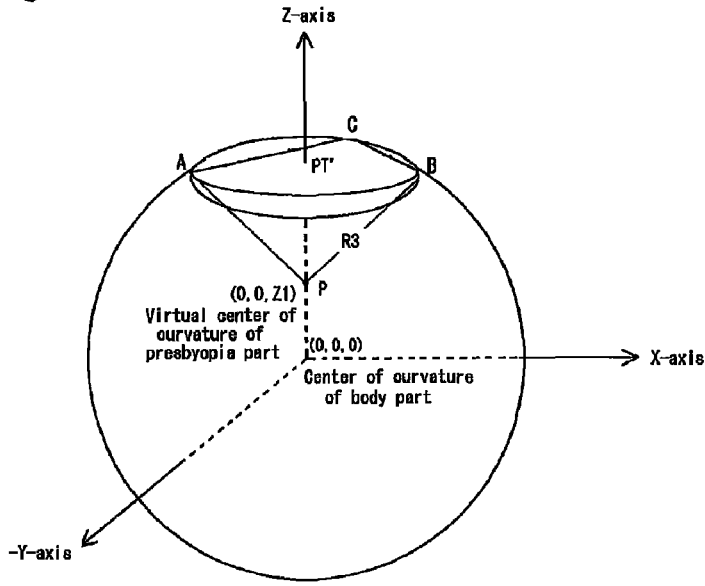
FIG. 5 is a perspective view further describing the presbyopia lens part of FIG. 4.
Figure 6:
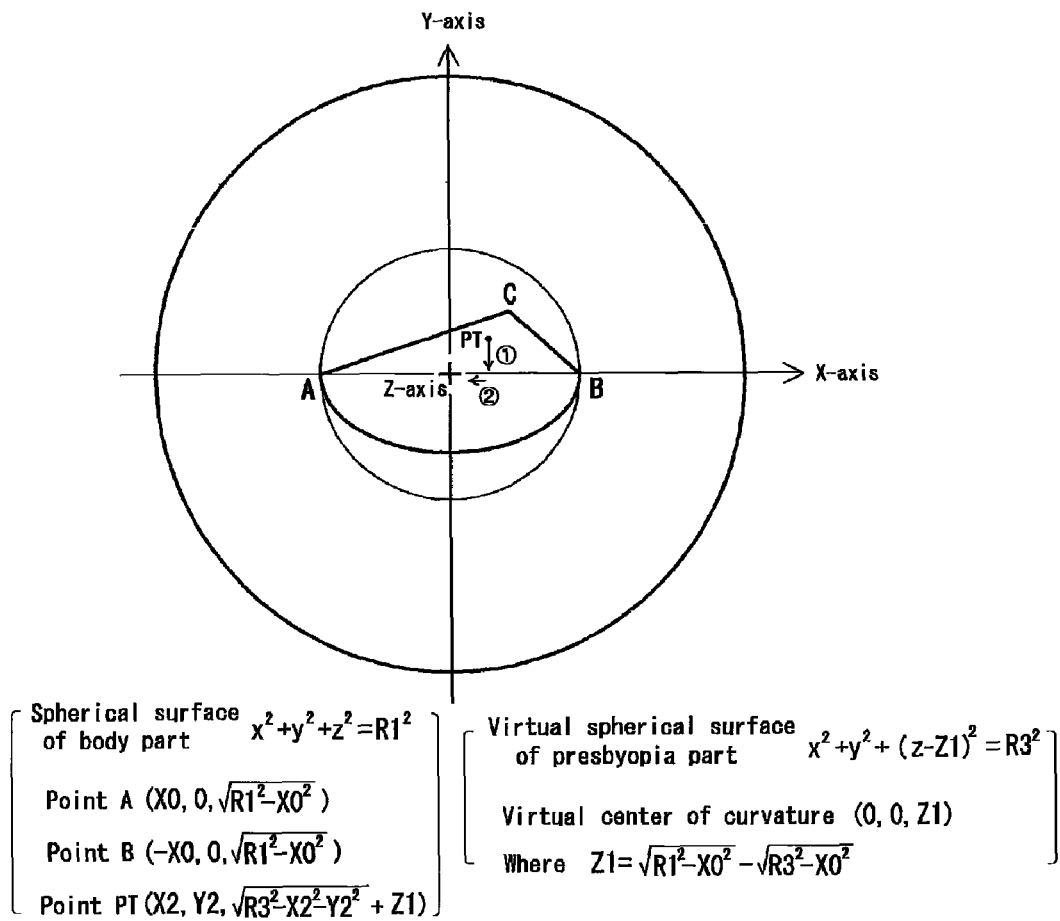
FIG. 6 is a plan view further describing the presbyopia lens part of FIG. 4.

FIGS. 4 to 6 are views describing another designing method. In this case, first, the middle point of the shortest curve on the sphere connecting the first terminal point A and the second terminal point B is set to be a provisional management point PT'. Then, hereafter, for the sake of description, the radius line connecting the curvature center O of the body lens part 1A and the provisional management point PT' is assumed to be the Z-axis (see FIG. 5). Also, for the sake of description, the X-axis is taken in parallel to the straight line connecting the first terminal point A and the second terminal point B, and the Y-axis is taken perpendicularly to the X-axis (see FIG. 6).

Then, the spherical surface having a radius of curvature R3 is determined so that the first terminal point A and the second terminal point B will be both located on the spherical surface having the first radius of curvature R1. Then, the spherical surface having a radius of curvature R3 will form a virtual outline CIR shown in FIG. 4(b) on the spherical surface having the first radius of curvature R1. Here, since the first terminal point A and the second terminal point B are located on the spherical surface having the first radius of curvature R1, the coordinates of the first terminal point A will be $(X0, 0, SQR(R1^2-X0^2))$, and the coordinates of the second terminal point B will be $(-X0, 0, SQR(R1^2-X0^2))$.

Figure 7:
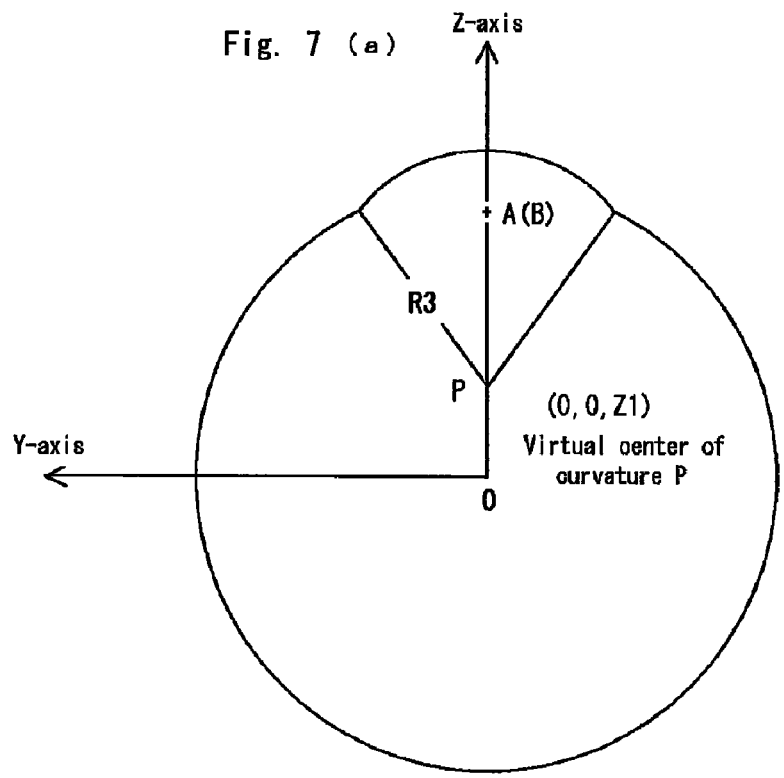
FIGS. 7(a) to 7(b) are views describing a method of making fine adjustments on the presbyopia lens part of FIG. 4.
Figure 7:
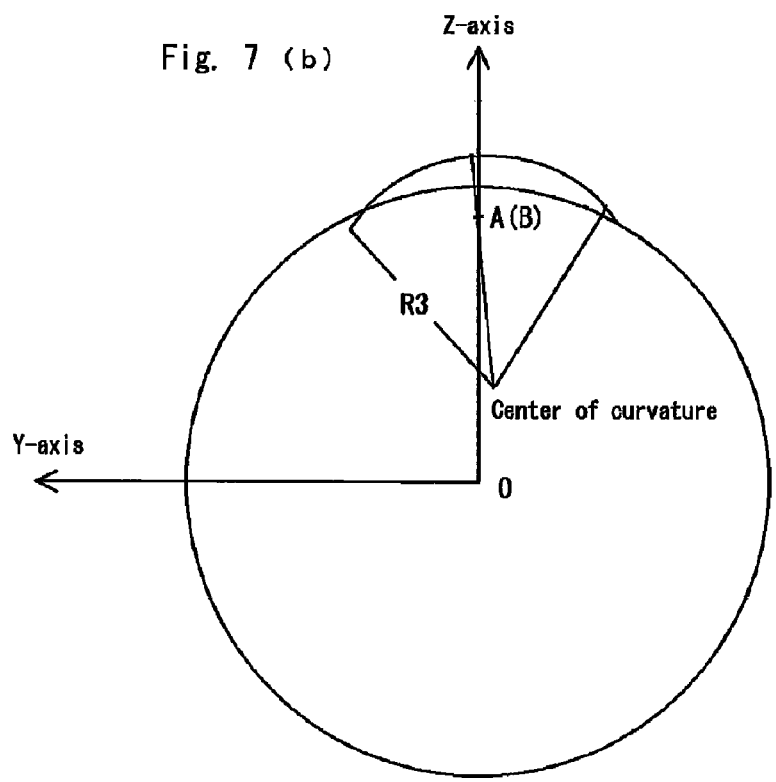
Figure 8:
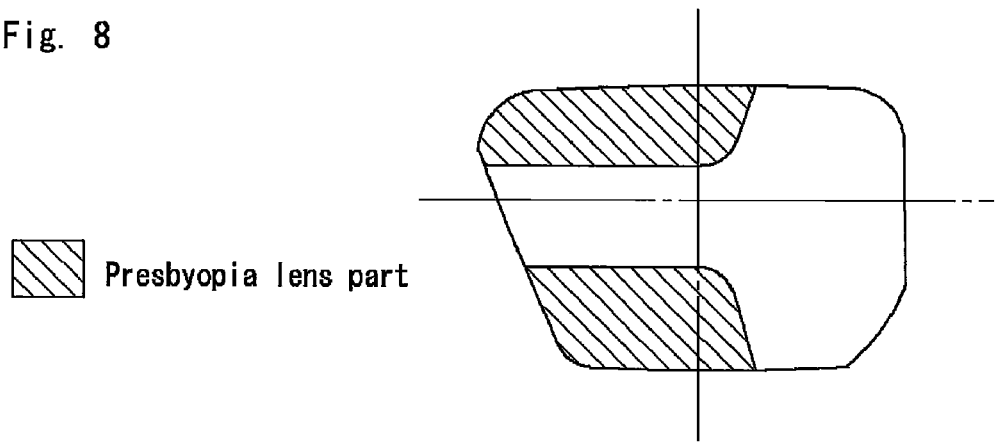
FIG. 8 is a plan view describing another embodiment.
Figure 9:
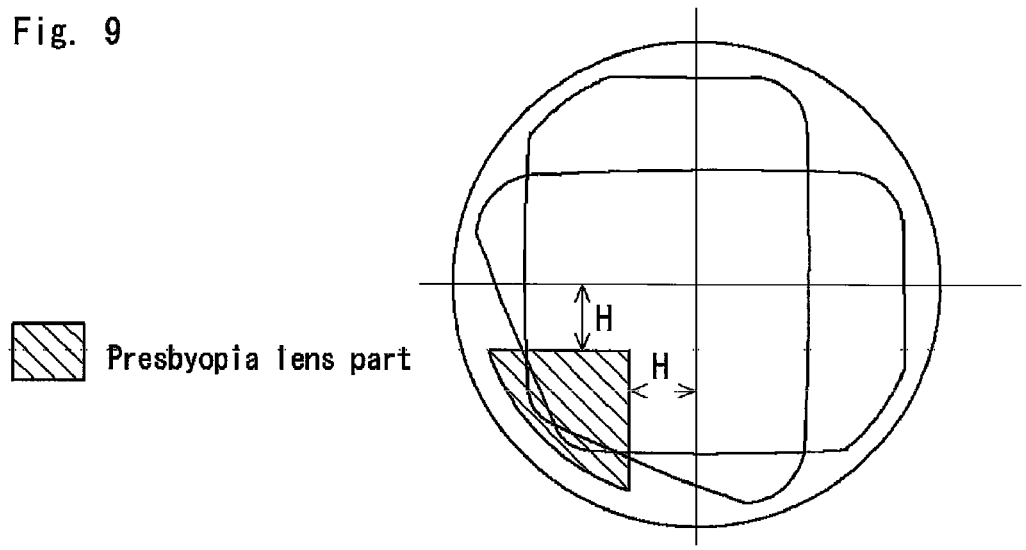
FIG. 9 is a plan view describing still another embodiment.
Figure 10:
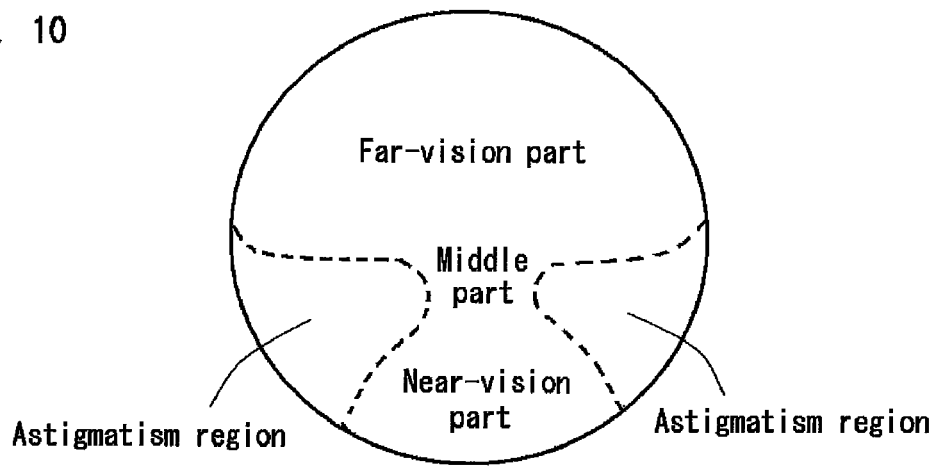
FIG. 10 is a view describing the problems in a progressive lens.

Here, if the coordinate value of the curvature center P of the third radius of curvature R3 is provisionally assumed to be (0, 0, Z1) as shown in FIG. 7(a), the first terminal point A will be located also on the spherical surface having the third radius of curvature R3, so that the value of Z1 can be uniquely specified. Specifically, since the spherical surface of the presbyopia lens part 1B is given by the equation $[x^2+y^2+(z-Z1)^2=R3^2]$, by substituting the coordinate value of the first terminal point A $(X0, 0, SQR(R1^2-X0^2))$ into this equation, the position of the curvature center P is specified to be $Z1=SQR(R1^2-X0^2)-SQR(R3^2-X0^2)$.

FIG. 7(a) shows the circular arc of the presbyopia lens part 1B specified in this manner, including the virtual part. However, since the actual presbyopia lens part 1B has a planar shape such as shown in FIG. 2, not a little step difference may be generated on the boundary line. Therefore, in order to eliminate the step difference of the boundary line, the whole presbyopia lens part 1B is virtually rotated with the rotation axis being the straight line connecting the first terminal point A and the second terminal point B. In this rotation operation, the first terminal point A and the second terminal point B are in a fixed state and do not move; however, when they are rotated in a counterclockwise direction in FIG. 7(a), the state is shifted to the state of FIG. 7(b). By this rotation operation in the counterclockwise direction, the management point PT is moved as shown by the first arrow in FIG. 6.

Next, when needed, the first terminal point A is set to be in a fixed state, and the second terminal point B is rotated on the X-Z plane. By this rotation operation, the management point PT is moved as shown by the second arrow in FIG. 6. Here, depending on the positional relationship between the provisional management point PT' and the management point PT, it goes without saying that the second terminal point B is set to be in a fixed state, and the first terminal point A is rotated on the X-Z plane.

As shown above, the embodiments of the present invention have been specifically described including the designing method. However, the contents of the specific description are not particularly intended to limit the present invention. In particular, as to the spherical surface having the third radius of curvature R3, the arrangement position and the arrangement angle are suitably changed so as not to deteriorate the fashion property within a range that does not generate an optical obstacle.

The invention claimed is:

1. A bifocal lens for eyeglasses constituted of a single material with a uniform refractive index and provided with a presbyopia lens part used for looking at something near and a portion of a body lens part used for looking at something at a distance, wherein said presbyopia lens part is formed of an upper side which is generally horizontal when used, a lateral side of an ear which continues to said upper side and expands toward the ear, and a lower side parallel to the peripheral shape of the lower side of an eyeglass so as to have a generally circular-arc shape or a generally rectangular shape as a whole, and said upper side and said lateral side form a generally straight boundary line which is recognizable by a user, wherein a contact point of said upper side and said lateral side is positioned to be shifted towards the ear side from an apex of warpage of said body lens part.

2. The bifocal lens for eyeglasses according to claim 1, wherein said body lens part is constituted of an outer spherical surface on a field-of-view side formed with a first radius of curvature and an inner spherical surface on a pupil side formed with a second radius of curvature equal to or larger than the first radius of curvature, and said boundary line is formed on said outer spherical surface.

3. The bifocal lens for eyeglasses according to claim 2, constituted in such a manner that a pair of substrate lenses molded generally in a disk shape and constructed to be symmetric relative to right-and-left direction are cut out to accord to a pupil position of the user and the shape of an eyeglass frame.

4. A pair of bifocal eyeglasses using the bifocal lens according to claim 2.

5. The bifocal lens for eyeglasses according to claim 1, wherein said body lens part is constituted of an outer spherical surface on a field-of-view side formed with a first radius of curvature and an inner spherical surface on a pupil side formed with a second radius of curvature smaller than the first radius of curvature, and said boundary line is formed on said inner spherical surface.

6. The bifocal lens for eyeglasses according to claim 5, constituted in such a manner that a pair of substrate lenses molded generally in a disk shape and constructed to be symmetric relative to right-and-left direction are cut out to accord to a pupil position of the user and the shape of an eyeglass frame.

7. A pair of bifocal eyeglasses using the bifocal lens according to claim 5.

8. The bifocal lens for eyeglasses according to claims 1, wherein
said presbyopia lens part is disposed to be separated at two positions in an up-and-down direction of a state of use,
the presbyopia lens part disposed on the upper side is formed of a lower side which is generally horizontal when used, the lateral side of the ear which continues to said lower side and goes upwards, and an upper side parallel to the peripheral shape of the upper side of an eyeglass frame so as to have a generally circular-arc shape or a generally rectangular shape as a whole, and
said lower side and said lateral side form a generally straight boundary line that is recognizable by a user.

9. A pair of bifocal eyeglasses using the bifocal lens according to claim 8.

10. A pair of bifocal eyeglasses using the bifocal lens according to claim 1.

11. The bifocal lens for eyeglasses according to claim 1, wherein a curvature management point of said presbyopia lens part is positioned to be shifted towards the nose side from the apex of warpage of said body lens part.

12. A pair of bifocal eyeglasses using the bifocal lens according to claim 11.

13. The bifocal lens for eyeglasses according to claim 11, constituted in such a manner that a pair of substrate lenses molded generally in a disk shape and constructed to be symmetric relative to a right-and-left direction are cut out to accord to a pupil position of the user and a shape of an eyeglass frame.

14. A pair of bifocal eyeglasses using the bifocal lens according to claim 13.

15. A bifocal lens for eyeglasses constituted of a single material with a uniform refractive index and provided with a presbyopia lens part used for looking at something near and a portion of a body lens part used for looking at something at a distance, wherein
said body lens part is constituted of an outer spherical surface on a field-of-view side formed with a first radius of curvature and an inner spherical surface on a pupil side formed with a second radius of curvature smaller than the first radius of curvature, and
a boundary line of said presbyopia lens part and said body lens part is formed on said inner spherical surface.

16. A pair of bifocal eyeglasses using the bifocal lens according to claim 15.

* * * * *